HIGH FREQUENCY AMPLIFIER CIRCUIT

Filed Dec. 22, 1954 2 Sheets-Sheet 1

Inventors:
Norman T. Lavoo,
Rudolph A. Dehn,
James E. Beggs,
by Paul A. Frank
Their Attorney.

HIGH FREQUENCY AMPLIFIER CIRCUIT

Filed Dec. 22, 1954 2 Sheets-Sheet 2

Inventors:
Norman T. Lavoo,
Rudolph A. Dehn,
James E. Beggs,
by Paul A. Frank
Their Attorney.

United States Patent Office 2,847,518
Patented Aug. 12, 1958

2,847,518

HIGH FREQUENCY AMPLIFIER CIRCUIT

Norman T. Lavoo, Watervliet, and Rudolph A. Dehn and James E. Beggs, Schenectady, N. Y., assignors to General Electric Company, a corporation of New York Application December 22, 1954, Serial No. 476,912

5 Claims. (Cl. 179—171)

This invention relates to high frequency discharge devices and associated circuits having improved operating characteristics, particularly at ultra high frequencies. More particularly, the invention pertains to high frequency grounded cathode amplifier circuits.

At low frequencies, where electron transit time is much less than the period of the operating signal, the grounded cathode amplifier circuit is quite common, and is used to secure high gain. The gain of a grounded cathode amplifier circuit is high at low frequencies because currents induced in the control grid, and hence the input circuit, by electrons approaching the grid are neutralized by the currents induced in the grid by electrons leaving the grid. As a result of this action, control grid, or input loading for this type amplifier circuit is quite low at low frequencies.

At high frequencies, however, at which the transit time becomes appreciable with respect to the period of the operating signal, transit angle becomes large, and tube lead reactance becomes significant. Then, the currents are shifted in phase with respect to one another, and hence, do not cancel out. Thus, as operating frequency increases, the grounded cathode amplifiers of the prior art suffer increasing input loading, with a corresponding loss of power gain. For this reason grounded cathode amplifier circuits have been heretofore unsuited for high frequency amplifier circuits. For high frequency operation, the grounded grid type amplifier is used instead. The grounded cathode circuit, however, offers a higher potential power gain than the grounded grid circuit due to the possibility of recovering energy back from the electron stream, which recovery is impossible with grounded grid circuits. For this reason it is desirable to provide a grounded cathode amplifier circuit suitable for high-gain operation at high frequencies. Attempts have been made in the past to adapt the grounded cathode amplifier to high frequency operation by feedback circuits which couple some of the output energy back into the input circuit and reduce input loading due to transit time effects. These attempts have not been satisfactory, for in order that the feedback be sufficient to reduce input loading, the circuit must be brought almost on the point of oscillation. The adjustments necessary are quite critical and any slight change in tube electrode configuration such as with temperature variations, causes oscillation. Additionally, such circuits are limited to narrow band operation due to the criticality of the feedback requirements.

It is therefore an object of the invention to provide a grounded cathode amplifier circuit suited for high and ultra high frequency operation.

Another object of the invention is to provide a high frequency amplifier circuit capable of high gain over a wide range of high and ultra high frequencies.

A further object of the invention is to provide a stable, high gain, amplifier circuit suitable for use over a wide range of high and ultra high frequencies.

Still another object of the invention is to provide means for reducing the power loading of the control grid circuit of a high frequency amplifier.

A further object of the invention is to provide a stable, high power gain, amplifier circuit in which the adverse effects of transit time at high frequencies are reduced to a minimum.

In accordance with the invention a disc-seal type electron discharge device is mounted in a modified concentric line input resonator with the electron discharge path transverse to the lengthwise axis of the resonator. The control grid of the discharge device is electrically coupled to the inner conductor of the input concentric line. The outer conductor of the input concentric line is electrically coupled to the screen grid which is capacitively coupled to the cathode so that the screen grid and cathode of the discharge device are at the same alternating current potential. Since the interelectrode distances and lead inductance within the discharge device may be maintained at a minimum with the disc type seal construction, transit angle is maintained at a minimum, and the phase difference between the currents induced by electrons approaching and leaving the control grid is small, control grid loading is thereby minimized, permitting high gain at high frequencies.

The novel features believed characteristic of the invention are set forth in the appended claims. The invention itself, however, may best be understood by reference to the following description, taken in connection with the accompanying drawings, in which:

Figure 1:
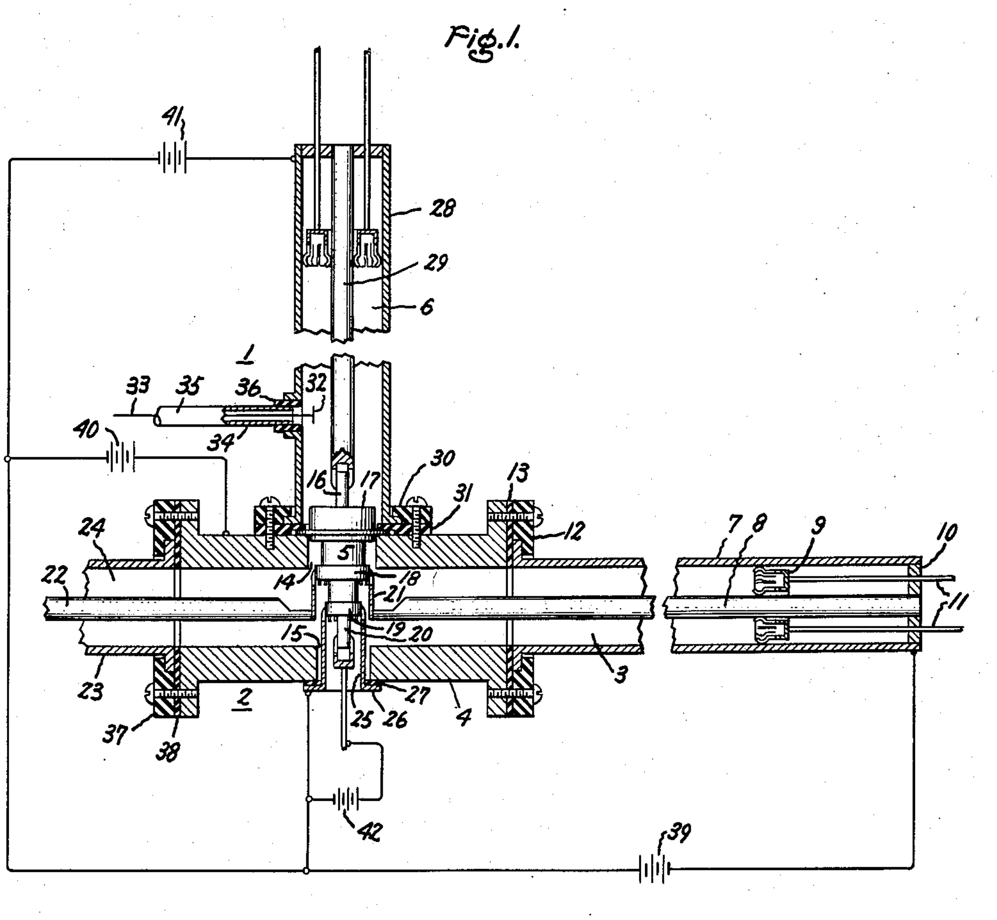
Fig. 1 is a cross-sectional view of one embodiment of the invention.

In Fig. 1 of the drawing there is shown an amplifier 1 in which an input resonator 2 comprising tuning stub 3 and central portion 4 is modified so as to incorporate therein an electron discharge device 5 in accordance with the invention. An output resonator 6 is arranged to be excited by the modulated electron discharge from the input resonator 2. As may be seen from the drawing, tuning stub 3 of input resonator 2 comprises a hollow outer conductor 7, and an inner conductor 8. While tuning stub 3 is herein represented as cylindrical, it will be appreciated that any of the cross-sectional shapes known to the art may be used. The resonator is here designed as a foreshortened quarter-wave resonator, the conductors 7 and 8 being spaced from one another at one end and having an annular slidable plunger 9 at the other end connecting inner and outer conductors. An annular closure member 10 is suitably fastened by well known means between conductors 7 and 8 at a point beyond the position of plunger 9 thus giving mechanical support to the inner conductor. Actuating rods 11 are fastened to the plunger or slider 9 and extend through annular end closure 10, to provide external means for positioning the tuning slider and thus adjust the frequency of the resonator to that of the input signal. The external conductor 7 of tuning stub 3 is insulatingly fastened to central portion 4 of input resonator 2 by means of annular collar member 12 constructed of a suitable insulating material. A capacitive coupling is maintained between external conductor 7 of tuning stub 3 and central portion 5 of resonator 2 through insulating washer 13 which may, for instance, be of mica or an equivalent dielectric. The capacitance between members 8 and 5 is preferably several hundred micro-microfarads. The central portion 4 of input resonator 2 may conveniently comprise a section of rectangular wave guide having therein oppositely disposed circular apertures 14 and 15 for receiving therein electron discharge device 5. As with tuning stub 3, central portion 4 of waveguide 2, though herein represented as rectangular, may have a circular cross-section or other shape well known to the art. Electron discharge device 5 comprises a disc seal type high frequency tetrode or a multi-electrode having at least four electrodes defining two interelectrode gaps. By disc seal type electron discharge device is meant an electron discharge device having plane parallel electrodes, preferably circular in shape, and having no conventional internal lead connections. Connections to the electrodes of disc seal electron discharge device 5 are made to the periphery of the electrodes which are sealed to non-conducting ceramic rings which also provide inter-electrode spacings. Such electron discharge devices are disclosed and claimed in the copending application of James E. Beggs, Serial No. 464,079, filed October 22, 1954, and assigned to the same assignee as the present invention. The exterior connections to disc seal tetrode 5 include anode connection 16, screen grid connection 17, control grid connection 18, cathode connection 19, and heater connection 20. Electron discharge device 5 is slidably inserted within aperture 14 in central portion 4 of input resonator 2. Screen grid connection of electron discharge device 5 makes a low impedance direct current contact with the body of central portion 4 of input resonator 2. Control grid connection 18 makes contact through a cylindrical resilient collar 21 to keyed ends of center conductor 8 of tuning stub 4 and with center conductor 22 of input coaxial line 24 which comprises inner conductor 22 and hollow outer conductor 23. Cathode contact 19 of electron discharge device 5 is connected through a resilient cylindrical collar 25 to annular capacitive coupling disc 26 which is capacitively coupled through dielectric disc 27 to the body of central portion 4 of input resonator 2 with a capacitance of the order of several hundred micro-microfarads. The cathode of electron discharge device 5 is thus maintained at the same radio-frequency potential as the central portion 4 of input resonator 2 but is insulated from the direct current potential thereof. Alternatively, however, the cathode may make direct connection with the input line, while the screen grid is capacitively coupled thereto.

Output resonator 6 suitably comprises a foreshortened quarter wave concentric resonator having a hollow outer conductor 28 and an inner conductor 29. Inner conductor 29 of output resonator 6 is connected to anode terminal 16 of electron discharge device 5. Outer conductor 28 is mechanically fastened to the body of central portion 4 of input resonator 2 by means of an annular spacing member 30 constructed of a suitable insulating material. Conductor 28 is maintained at the same radio-frequency potential as the body of central portion 4 of input resonator 2 but is insulated from the direct current potential thereof by means of dielectric disc 31 which may suitably comprise a mica, or other dielectric, washer. Energy is extracted from output resonator 6 by means of a suitable coupling link which may conveniently be capacitive plate 32 connected to the central conductor 33 of output coaxial line 35 which comprises central conductor 33 and outer conductor 34. Alternatively, however, an inductive coupling loop may be used. Outer conductor 34 of output concentric line 35 is maintained in mechanical connection with, but electrically insulated from, the direct current potential of output resonator 6 by means of insulating cylinder 36.

The input signal voltage $e_s$ is supplied to amplifier 1 through coaxial line 24 comprising hollow conductor 23 and central conductor 22. This signal may be applied to line 24 by means of a suitable capacitive or inductive coupling (not shown) well known to the art. Outer conductor 23 is mechanically connected to the central portion 5 of input resonator 2 by means of annular spacing member 37 constructed of a suitable insulating material. Outer conductor 23 is maintained at the same radio-frequency potential as the body of central portion 4 of resonator 2 but insulated from the direct current potential thereof by means of insulating dielectric disc 38 which may, for instance, be of mica.

Figure 2:
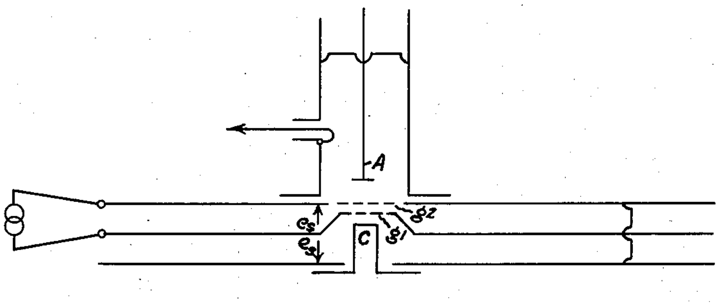
Fig. 2 is a diagrammatic sketch of the embodiment of Fig. 1.

In Fig. 2 of the diagram there is shown a schematic sketch of the amplifier shown sectionally in Fig. 1 of the drawing. From Fig. 2 it may be seen that a signal input is applied to the amplifier 1 between outer conductor 23 and inner conductor 22 of input coaxial line 24. The input signal is applied to amplifier 1 across the screen grid ($g_2$) and the control grid ($g_1$) of electron discharge device 5. Since the cathode ($c$) and screen grid ($g_2$) are capacitively coupled by the capacitance of dielectric disc 27, the cathode and screen grid are at the same radio-frequency potential. Therefore, the input signal is applied equally but in opposite alternating phase relationship across the cathode-control grid gap and the control-grid-screen-grid gap. A suitable direct current bias is applied between the cathode and the control grid of amplifier 1. This bias may conveniently be a negative potential of several tenths of a volt and may be supplied by battery 39. Screen grid ($g_2$) is maintained at a positive potential which may, for example, be of the order of 50 volts by a battery 40 and anode ($a$) of electron discharge device 5 is maintained at a suitable potential of approximately 200 volts by battery 41. In operation, heater voltage, which may suitably be supplied by a battery 42, is applied between heater contact 20 and cathode contact 19 of electron discharge device 6. The cathode is heated to thermionic emission temperature, electrons emitted therefrom are accelerated under the influence of the electric field within the interelectrode space, and are density modulated by the signal impressed upon the cathode-control grid gap by the input signal. Energy is extracted from the output resonator by means of coupling plate 31.

Figure 3:
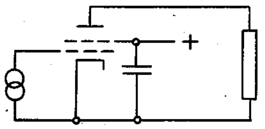
Fig. 3 is a conventional schematic diagram of the amplifier of Fig. 1.
Figure 4:
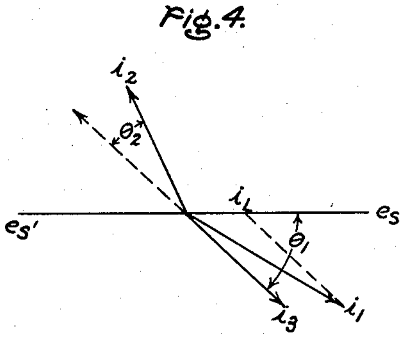
Fig. 4 is a vector diagram of the grid currents of the circuit of Fig. 3.

The schematic circuit of Fig. 3 represents the conventional grounded cathode amplifier. At low frequencies, the currents induced in the control grid by electrons approaching the control grid and by electrons receding from the control grid are substantially of equal magnitude and opposite phase. When plotted vectorially, these currents cancel each other with resultant zero grid loading. At higher frequencies, however, when transit time in the grid gaps becomes appreciable, the currents are more nearly represented by the vector diagram of Fig. 4. In Fig. 4, the current in the cathode control grid gap $i_1$ has been divided into two components. Component $i_3$ is the current induced in the control grid by electrons traversing the cathode-control grid gap. Component $i_L$ is the loading component due to electrons which do not reach the second gap but do load the signal source. Current $i_3$ lags $e_s$, the signal voltage, by an angle $\theta_1$ which is due to the cathode-control-grid transit time. The actual current induced in the screen grid control grid circuit is represented by $i_2$ which lags $i_3$ by $(180°+\theta_2)$ due to the control grid-screen grid transit time. The 180 degree component is due to the fact that, even assuming zero transit time, the current induced by electrons receding from the control grid is opposite to current induced by electrons approaching the control grid. To determine the net power supplied by the signal source from the vector diagram of Fig. 4, the summation of horizontal components is made and input power is equal to $$P=e_s[i_L+i_3\cos\theta_1-i_2\cos(\theta_1+\theta_2)] \quad (1)$$

Figure 5:
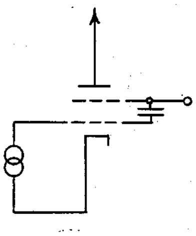
Fig. 5 is a schematic diagram of a grounded grid amplifier circuit useful in understanding the invention.

As is mentioned hereinbefore, at low frequencies, this is, in effect, equal to $(e_s.i_L)$ since $i_3\cos\theta_1$ is substantially equal to $i_2\cos(\theta_1+\theta_2)$. At very low frequencies $i_L$ is equal to zero and the input loading is negligible. The schematic circuit of the grounded grid amplifying circuit is shown in Fig. 5. In Fig. 5 the signal is applied between the control grid and the cathode and the control grid is capacitively coupled to the screen grid. Since the driving source is unable to recover power back from the second gap in this circuit, the power loading of the grid circuit is equal to $$P=e_s\times[i_L+i_3 \cos \theta_1] \qquad (2)$$

where $i_L$, $i_3$ and $\theta_1$ are the same as defined with respect to Fig. 4. In comparing the equations for input power loading for the grounded cathode and the grounded grid circuits, it may be seen that the grounded grid circuit input loading may not be reduced below the given value of $e_s(i_L+i_3 \cos \theta_1)$. However, the grounded cathode input loading may be reduced below the value of the grounded grid loading by a quantity depending upon the value of $\cos(\theta_1+\theta_2)$, which represents power recovered by the input circuit from the control-grid screen grid gap. Referring to the equation for input power loading in the grounded cathode circuit (Equation 1), it may be seen that when the $\cos \theta_1$ is equal to the $\cos(\theta_1+\theta_2)$, the input power loading will be a minimum. One effective means for insuring that $\theta_1$ will be as near as possible to $(\theta_1+\theta_2)$ is to make the D. C. screen voltage as high as possible to make second gap transit time negligible. In addition to the requirement that $\cos \theta_1$ be equal to $\cos(\theta_1+\theta_2)$, we have further required that the R. F. voltage appearing at the cathode-control grid gap and control grid-screen grid gap be equal and opposite in phase. This latter requirement is accomplished by coupling the screen grid to the cathode capacitively. Such is commonly done at low frequencies. Capacitive coupling between the cathode and screen grid becomes difficult, however, at high frequencies, and any attempt to capacitively couple the cathode and screen grid for a high frequency amplifying circuit has in the past resulted in condenser lead inductance, and a resulting high impedance path which makes it difficult to obtain grid-gap voltages of equal magnitude but opposite phase.

Figure 6:
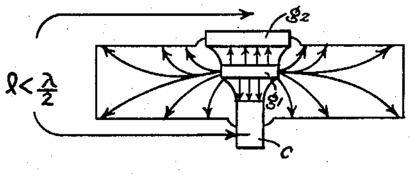
Fig. 6 is a cross-sectional view of the input resonator and discharge device of Fig. 1 and shows the field distribution therein.

According to this invention, however, the zero A. C. impedance path from screen grid to cathode is utilized and since the disc seal type plane parallel electron discharge device allows extremely small inter-electrode distances, thus reducing transit time and transit angle, the effect of transit time upon phase shift is minimized. The input signal which results in the field distribution within central portion 5 of input resonator 2 as shown in Fig. 6 of the diagram feeds both the control grid-cathode gap and the screen grid-control grid gap with the voltage $e_s$ the phase difference of which is substantially 180°. Referring again to the vector diagram of Fig. 4, the above criteria means that the in-phase or horizontal components of $i_2$ and $i_1$ will be nearly equal. This is due to the fact that the zero A. C. impedance coupling between cathode and screen grid allows voltages of equal magnitude but opposite phase to be impressed upon the two gaps. Power loading of the input circuit is thus maintained at a minimum for high and ultra high frequencies. The frequencies at which input loading may be reduced to permit the use of a grounded cathode amplifier in accord with this invention are dependent upon the size of the circuit components. One limiting feature, however, is the fact that the size-frequency must be such that operating in the transverse electric magnetic mode (TEM), the input signal apply voltages of equal magnitude and phase to cathode and screen grid. This condition is satisfied for the TEM mode when the circumference of the outer surface of the cavity resonator is equal to or less than the wavelength of the operating signal. This criterion is equally applicable to circular and other cross-sectionally shaped resonators as well as the rectangular shape illustrated in Fig. 6.

In practical tetrode tubes operating at low level at 3,000 megacycles, $i_L$ has been experimentally determined to be approximately equal to $(i_3 \cos \theta_1)$. Thus, at 3,000 megacycles an amplifier using the circuit of this invention having a grounded cathode circuit may be made to require only half the driving power of an equivalent grounded grid connection. At lower frequencies much greater improvements may be obtained as the loading effects of $i_L$ become much less at the reduced input transit times.

While we have described above certain specific and alternative embodiments of our invention, many modifications can be made. It is to be understood, therefore, that we intend, by the appended claims, to include all such modifications as fall within the true spirit and scope of the invention.

What we claim as new and desire to secure by Letters Patent of the United States is:

1. A high frequency amplifier circuit comprising a concentric cavity input resonator including inner and outer conductors, an electron discharge device within said resonator, said device including in plane parallel relationship a cathode, a first grid, a second grid, and an anode, means external of said device for coupling said cathode to the exterior conductor of said concentric cavity resonator, means for coupling said first grid to the interior conductor of said concentric cavity resonator, means for coupling said second grid to the exterior conductor of said concentric cavity resonator, and an output cavity resonator coupled to said anode.

2. A high frequency amplifier circuit comprising a concentric cavity input resonator including inner and outer conductors, an electron discharge device within said resonator, said device including in plane parallel relationship a cathode, a first grid, a second grid, and an anode, capacitive means external of said device for coupling said cathode to the exterior conductor of said concentric cavity resonator, means for directly coupling said first grid to the interior conductor of said concentric cavity resonator, means for directly coupling said second grid to the exterior conductor of said concentric cavity resonator, and an output cavity resonator coupled to said anode.

3. A high frequency amplifier circuit comprising a concentric cavity input resonator including inner and outer conductors, an electron discharge device within said resonator, said device including in plane parallel relationship a cathode, a first grid, a second grid, and an anode, said cathode and first grid defining a first grid gap and said first grid and second grid defining a second grid gap, capacitive means for coupling said cathode to the exterior conductor of said concentric cavity resonator, means for directly coupling said first grid to the interior conductor of said concentric cavity resonator, means for directly coupling said second grid to the exterior conductor of said concentric cavity resonator, an output cavity resonator coupled to said anode, and means for applying an input signal between the inner and outer conductors of said input resonator, whereby said signal appears simultaneously across said first grid gap and said second grid gap in opposite alternating phase relationship.

4. A high frequency amplifier circuit comprising an electric discharge device including a cathode electrode, a first grid electrode, a second grid electrode and an anode electrode supported in mutually spaced and insulated relation in the order named, a terminal connected with each of said electrodes and spaced from one another in a given direction, a coaxial resonator extending in a direction perpendicular to said given direction and having the center conductor thereof connected with the terminal of said first grid electrode and the outer conductor coupled with respect to high frequencies to the terminals of both said cathode electrode and said second grid electrode and an output resonator coupled to said anode electrode and said second grid electrode.

5. A high frequency amplifier circuit comprising an electric discharge device including a cathode electrode, a first grid electrode, a second grid electrode and an anode electrode supported in mutually spaced and insulated relation in the order named, a terminal member connected with each of said electrodes and spaced from one another in a given direction, a coaxial resonator extending in a direction perpendicular to said given direction and having aligned openings in the opposite side walls and in the center conductor thereof and receiving said electric discharge device with the ends of the center conductor on opposite sides of the opening therein connected with the terminal of said first grid electrode and the outer conductor coupled with respect to high frequencies to both said cathode electrode and said second grid electrode adjacent said aligned openings and an output resonator coupled to said anode electrode and said second grid electrode.

References Cited in the file of this patent

UNITED STATES PATENTS

| | | |
|---|---|---|
| 2,258,254 | MacArthur | Oct. 7, 1941 |
| 2,706,802 | Meisenheimer et al. | Apr. 19, 1955 |